United States Patent
VanNoy et al.

(10) Patent No.: US 6,884,205 B2
(45) Date of Patent: Apr. 26, 2005

(54) NON-MARKING WEB CONVEYANCE ROLLER

(75) Inventors: Gary L. VanNoy, Hilton, NY (US); Brian S. Rice, Fairport, NY (US); Fernando Ramos, Jr., Rochester, NY (US); Daniel C. Lioy, Rochester, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/968,392

(22) Filed: Oct. 2, 2001

(65) Prior Publication Data

US 2003/0062248 A1 Apr. 3, 2003

(51) Int. Cl.[7] .................. A01B 29/00; B21K 1/02; B65H 20/02
(52) U.S. Cl. ................. 492/37; 492/30; 492/58; 492/54; 29/895.3; 29/895.32; 226/193
(58) Field of Search ............... 492/31, 30, 33, 492/34, 36, 37, 35, 58, 54; 29/895.3, 895.31, 895.32; 226/193

(56) References Cited

U.S. PATENT DOCUMENTS

| | | | |
|---|---|---|---|
| 3,405,855 A | | 10/1968 | Daly et al. |
| 3,723,083 A | * | 3/1973 | Ritter et al. ............... 29/895.3 |
| 4,026,007 A | * | 5/1977 | Brower ......................... 492/37 |
| 4,217,769 A | * | 8/1980 | Damrau ........................ 492/37 |
| 4,426,757 A | | 1/1984 | Hourticolon et al. |
| 4,841,611 A | * | 6/1989 | Kusaba et al. ................ 492/31 |
| 4,910,843 A | | 3/1990 | Lioy et al. |
| 4,914,796 A | * | 4/1990 | Lioy et al. .................. 205/151 |
| 4,925,626 A | * | 5/1990 | Anand et al. .................. 419/18 |
| 4,970,768 A | * | 11/1990 | Lioy et al. .................... 492/37 |
| 4,977,656 A | * | 12/1990 | Lioy et al. .................... 492/37 |
| 5,656,081 A | * | 8/1997 | Isen et al. ................... 101/153 |
| 5,997,456 A | * | 12/1999 | Butters et al. ................ 492/56 |
| 6,077,207 A | * | 6/2000 | Yokoyama et al. ............ 492/30 |

* cited by examiner

Primary Examiner—Marc Jimenez
(74) Attorney, Agent, or Firm—Clyde E. Bailey, Sr.

(57) ABSTRACT

A non-marking web conveyance roller has a generally irregular surface with a plurality of rounded up features that promotes superior venting of entrained air. The surface finish of the roller, formed by a thermal spray process, prevents the formation of impression and honing defects on the conveyed web.

5 Claims, 8 Drawing Sheets

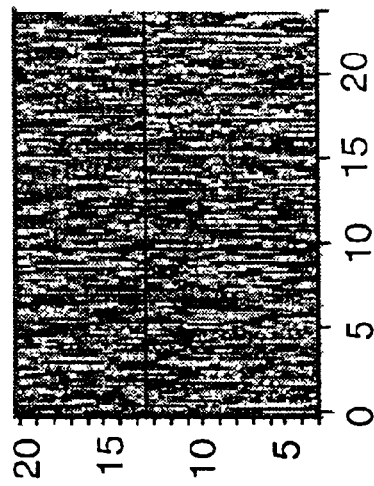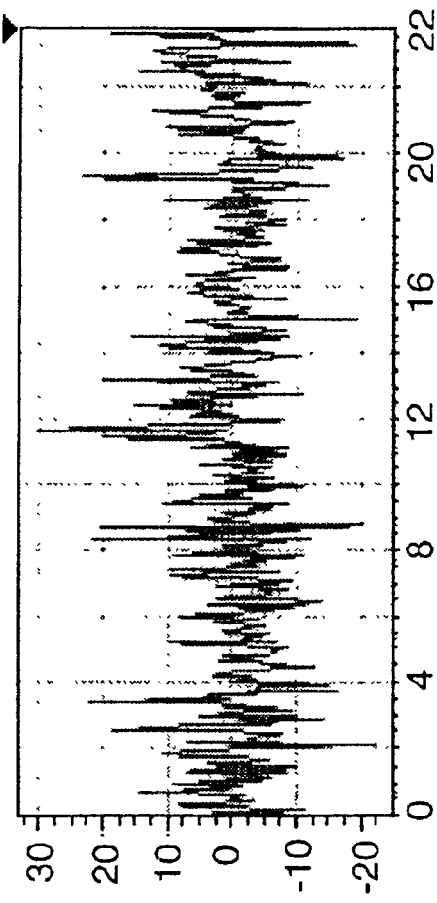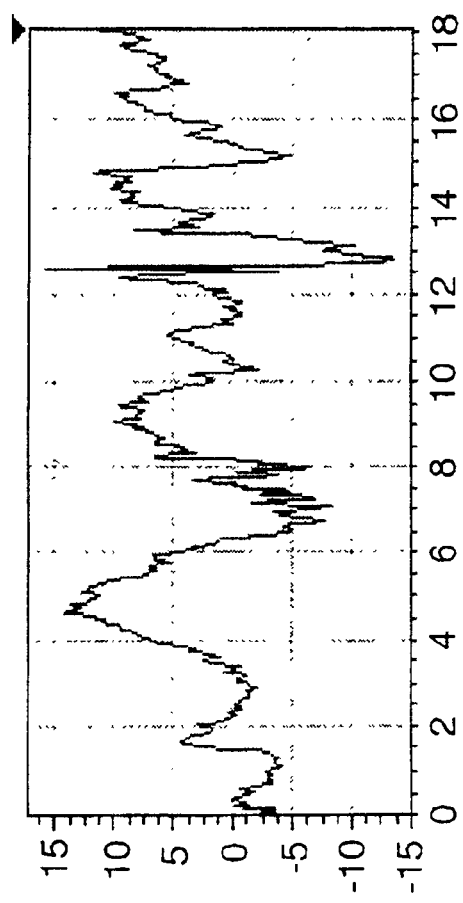
Fig. 3A (Prior Art)
Fig. 3B (Prior Art)

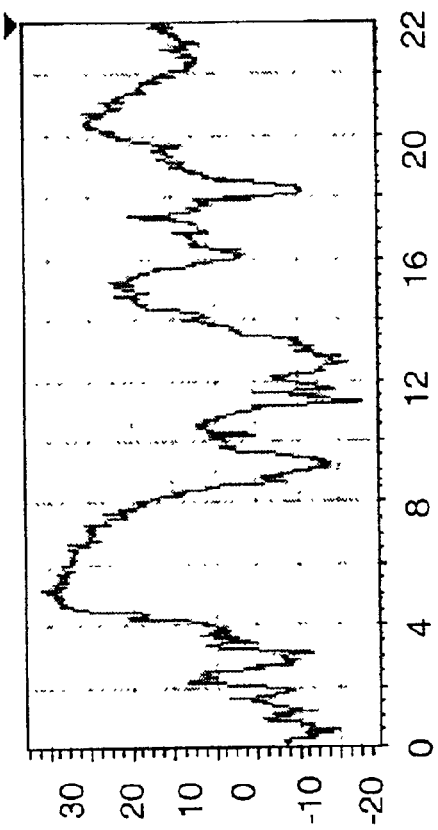
Fig. 7A
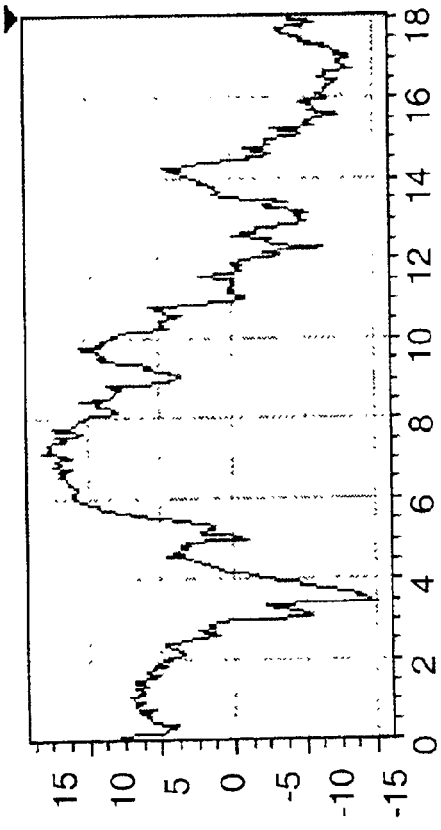
Fig. 7B
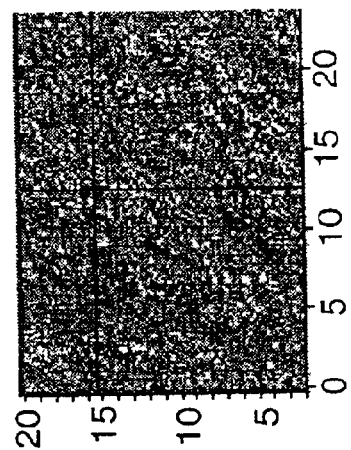

US 6,884,205 B2

NON-MARKING WEB CONVEYANCE ROLLER

FIELD OF THE INVENTION

The invention relates generally to the field of web conveyance rollers. More particularly, the invention concerns a web conveyance roller and method of making same characterized by a surface finish that eliminates the occurrence of objectionable impression and honing defects in the conveyed web.

BACKGROUND OF THE INVENTION

In the art of web conveyance, venting of air entrained between a web and a conveyance roller is needed to maintain contact between the web and the roller. Referring to FIG. 1A, a typical conveyance roller 1 with a web 2 trained around a portion of the roller surface 4 is illustrated. As the speed of the web 2 increases, the entrained air partially or wholly lifts the web 2 off the roller surface 4 which allows relative motion between the web 2 and the roller surface 4 to develop. This relative motion often results in damage (such as scratching) to the web 2 and associated machine conveyance problems (such as poor tracking).

Referring again to FIG. 1A, it is well known that air entrainment occurs when the boundary layer of air that travels with both the web 2 and roller 1 is drawn into the web-to-roller interface 5. There are several existing roller surface technologies that have addressed, to some extent, venting of entrained air and the associated surface defects that arise if the air is not sufficiently vented. These roller surface technologies include: (1) grooved rollers described, for instance, in U.S. Pat. No. 3,405,855 by Daley et al., Oct. 15, 1968, titled "Paper Guide and Drive Roll Assemblies"; (2) grit-blasted rollers, disclosed, for instance, in U.S. Pat. No. 4,426,757 by Hourticolon et al., Jan. 24, 1984, titled "Web Guide Roller For Use At High Speeds And Process For Producing The Same;" and, (3) shot blasted rollers described, for instance, in U.S. Pat. No. 4,910,843 by Lioy et al, Mar. 27, 1990, titled "A Process For Finishing The Surface Of A Roller." Experience has shown that each of these technologies can and do cause surface defects such as surface impressions in the web that mirror the roller surface venting pattern and/or roller surface roughness. These problems are particularly worrisome on highly sensitive webs, such as photosensitive film and paper, in areas of the web conveyance machine where the web or coatings are sensitive to marking. Particular examples include surface impression defects that can occur in the manufacture of soft webs like acetate, having a high solvent content or Poly(ethylene terephthalate) (PET), near or above the glass transition temperature ($T_g$).

Referring to FIGS. 1B and 2B, a highly polished roller surface 4 used in most web conveyance devices (not shown) has a typical surface roughness characterized by an $R_a$ value of less than 7 micro-inches (FIGS. 3A and 3B). This level of surface roughness minimizes the sharp up features that can damage the web 2 or coatings due to impressions or minute scratches. Commonly referred to as honing, this defect is caused by web dimensional changes during contact with a roller surface 4. FIG. 9 illustrates an image of a web conveyed on a typical prior art roller which produced a honing defect 6 typically caused by a smooth, grit-blasted or shot-blasted roller.

Referring again to FIGS. 1B and 2B, experience has shown that the polished roller 4 (described above) can cause a larger scratch defect in the conveyed web at tensions less than 175 N/m and at web speeds above 15 m/min. These larger scratches are caused by large relative motion between the web 2 and roller surface 4 due to loss of traction between the web 2 and roller surface 4 caused by air entrainment. Experience has also shown that using conventional roller surface technology (e.g. grooved rollers, grit-blasted rollers, and plateau honed shot-blasted rollers) to vent the entrained air prevents the larger scratches caused by loss of traction. However, the minute defects (e.g. impressions and honing) are worse than they were on the highly polished rollers.

With reference to FIG. 1A, grit blasted rollers provide air venting because the rough surface provides areas for the entrained air to go without lifting the web 2 away from the roller surface 4. However, the grit blasting process produces sharp up features that cause impressions and honing. Polishing the surface 4 still leaves sharp up features and impressions, and honing problems remain. Shot-blasted rollers also have sharp up features due to the nature of the manufacturing process. Again, it is our experience that grinding the roller surface 4 still leaves sharp up features and impressions, and honing problems remain. Moreover, it is our experience that grooved rollers, even ones with well-rounded groove corners and lands with surface roughness characterized by an $R_a$ less than 5 micro-inches, cause impressions and honing.

Referring again to FIG. 1A, another problem common to typical high-traction conveyance rollers is the collection of debris that adheres tenaciously to the roller surface 4. This debris may come from the web 2 or from the environment and cause the same defects as sharp up features on the roller surface 4 as described previously.

A commonly accepted solution to the aforementioned problem is to run higher tensions on smooth rollers (tensions up to 500 N/m) to prevent loss of traction due to air entrainment at speeds up to 150 m/min. However, higher tensions are not generally desirable because they can make impression defects worse. Moreover, high tension can also cause orientations of the polymer chains that are undesirable (e.g. triacetate retardation, polyester heat relax). Furthermore, the aforementioned solution cannot be used everywhere in web conveyance devices because rollers with different surface finishes are used depending on the process conditions in a particular machine section.

Therefore, a need persists in the art for a web conveyance roller that maximizes venting of entrained air and that has a surface finish that resists the formation of markings on the conveyed web, such as impression and honing defects.

SUMMARY OF THE INVENTION

It is, therefore, an object of the invention to provide a web conveyance roller that provides exceptional traction and that eliminates objectionable surface defects, particularly impression and honing defects, in the conveyed web.

It is another object of the invention to provide a roller that has a surface that resists collecting surface debris in a web conveyance application.

Yet another object of the invention is to provide a method of making a web conveyance roller having a textured surface finish that resists defects in conveyed web.

The conveyance roller of the invention has a generally irregular surface with generally rounded up features, many of which overlap to form venting pathways randomly in the surface. Rounded up features have a roughness coefficient $R_a$ in the range of about 20 micro-inches to about 500 micro-inches to eliminate scratching a web conveyed by the roller. The height of the rounded up features is greater than about 0.00005 inches to about 0.002 inches.

The present invention is directed to achieving one or more of the objects, features, and advantages set forth herein. Briefly summarized, in one aspect of the present invention, a web conveyance roller has a generally irregular surface, said generally irregular surface comprising a plurality of generally rounded up features, many of said generally rounded up features overlapping to form venting pathways randomly arranged along said generally irregular surface of said web conveyance roller, the height of said generally rounded up features being greater than about 0.00005 inches but less than about 0.002 inches, said generally irregular surface comprising said generally rounded up features having an $R_a$ in the range from about 20 micro-inches to about 500 micro-inches to avoid scratching a web conveyed by said web conveyance roller.

In another aspect of the invention, a method of fabricating a web conveyance roller having rounded up features has a height ranging from about 0.00005 inches to about 0.002 inches, made by a process comprising thermal spraying a finely dispersed molten powder selected from the group consisting of WC—Co, WC—Co—Cr, WC—NiCr, and WC—NiCr—C onto a select substrate.

The textured surface of the conveyance roller of the invention has numerous advantageous effects: it eliminates the occurrence of honing and impression surface defects; it inhibits the collection of surface debris; the non-marking and high release surface characteristics enable the roller to be used in multiple locations in the conveyance machine environment; and, the roller surface has much improved traction properties which significantly reduces incidences of web scratches.

BRIEF DESCRIPTION OF THE DRAWINGS

The above and other objects, features, and advantages of the present invention will become more apparent when taken in conjunction with the following description and drawings wherein identical reference numerals have been used, where possible, to designate identical features that are common to the figures, and wherein:

FIG. 3A is a two-dimensional plot of the surface roughness of a typical web conveyance roller in the x-direction;

FIG. 3B is a two-dimensional plot of the surface roughness of a typical web conveyance roller in the y-direction;

FIG. 7A is a two-dimensional plot, measured in the x-direction, of the surface roughness of the web conveyance roller of the invention;

FIG. 7B is a two-dimensional plot, measured in the y-direction, of the surface roughness of the web conveyance roller of the invention;

DETAILED DESCRIPTION OF THE INVENTION

Figure 1A:
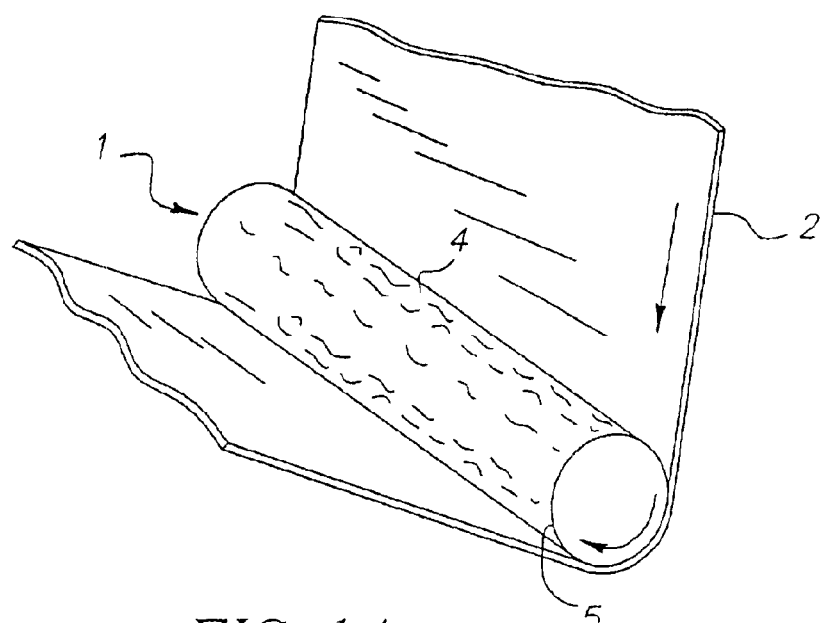
FIG. 1A is a view of a prior art web conveyance roller with a web trained around a portion of the roller surface.

Turning now to the drawings, and in particular to FIGS. 2A, 5, 6, and 10, the irregular textured roller surface 12 of the web conveyance roller 10 (shown here in cross-section) of the invention is illustrated. Best illustrated in FIG. 10, irregular textured surface 12 bearing web 2 is characterized by a plurality of generally rounded up features 14, formed by thermally sprayed molten resin (described below), on a substrate 13. Many of the rounded up features 14 overlap to form a plurality of venting pathways 16 whose configuration conforms to the spacing between adjacent rounded up features 14. It is well known that venting pathways 16 enable air entrained between the interface 5 of the roller surface 12 and web 2 to be vented away from the web 2 thereby enabling more consistent web-to-roller contact. In the roller surface 12 of the invention, venting pathways 16 are randomly formed on the surface 12 and constitute at least about 25% of the surface area of the roller 10.

Figure 2A:
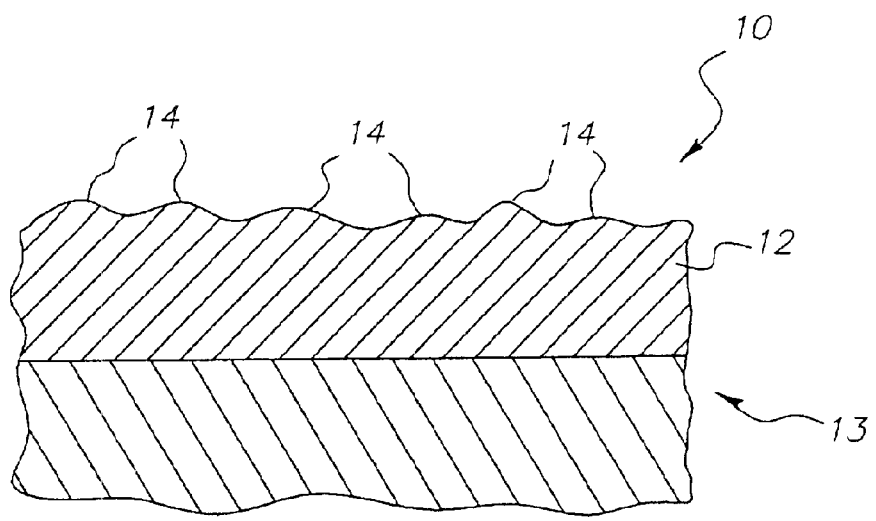
FIG. 2A is an enlarged fragmentary cross-section view of a base roller with a surface finish of the invention.
Figure 1B:
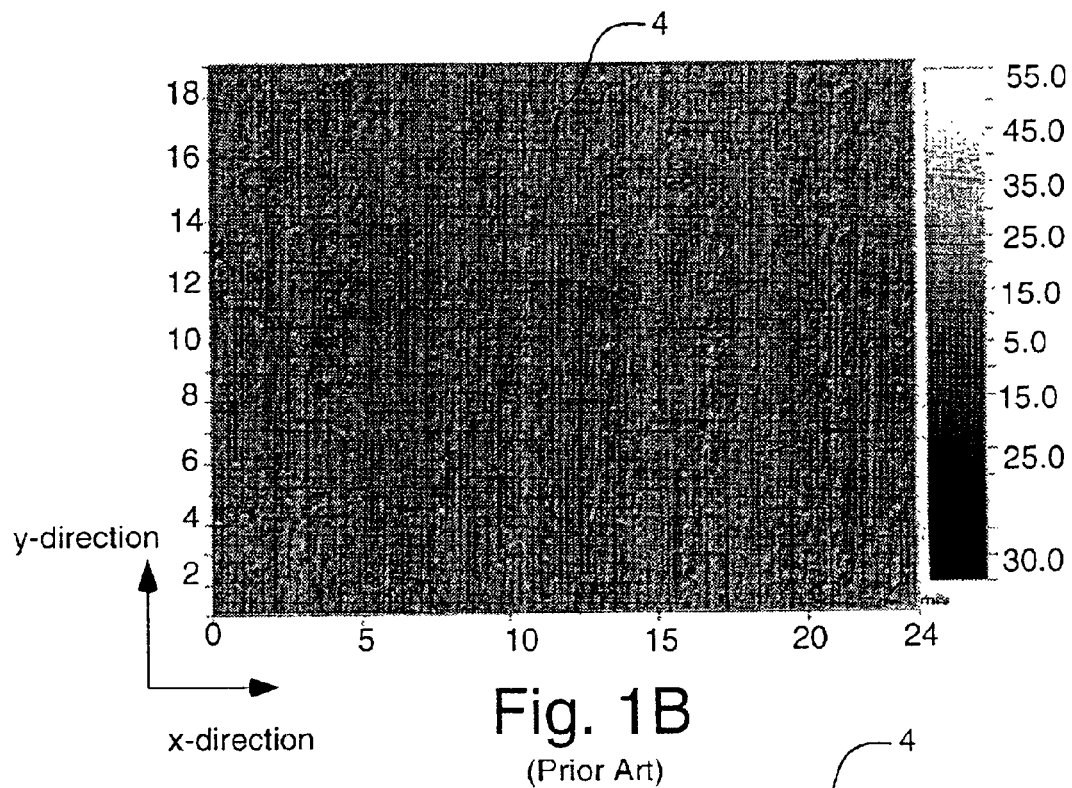
FIG. 1B is an illustration of a prior art polished roller surface used to convey web.
Figure 2B:
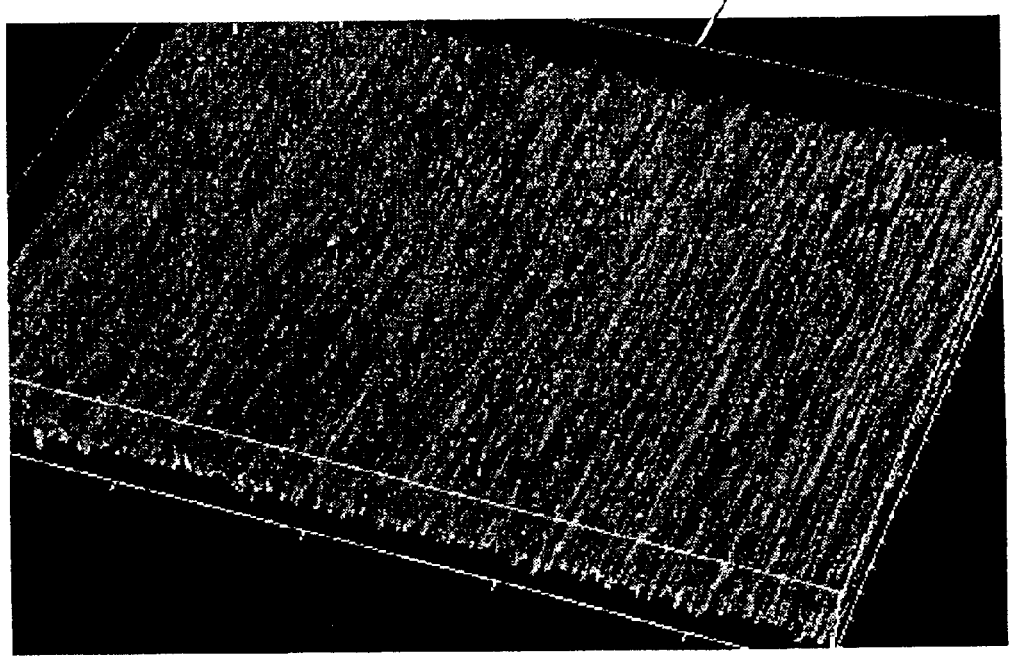
FIG. 2B is a three-dimensional plot of a prior art web conveyance roller.
Figure 5:
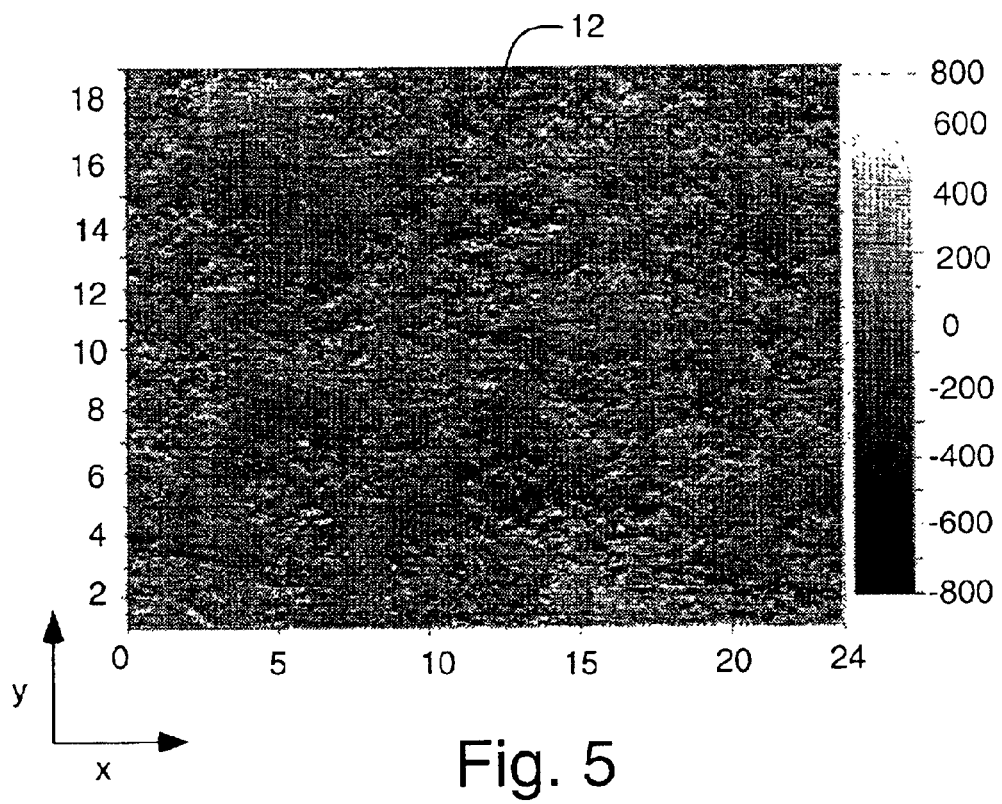
FIG. 5 is an illustration of the surface of the roller of the invention.
Figure 6:
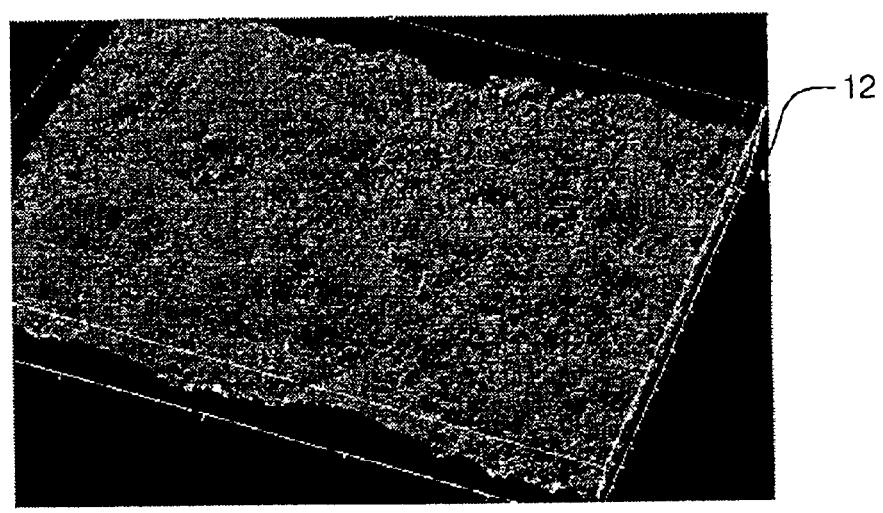
FIG. 6 is a three-dimensional view of the surface of the roller of the invention.
Figure 9:
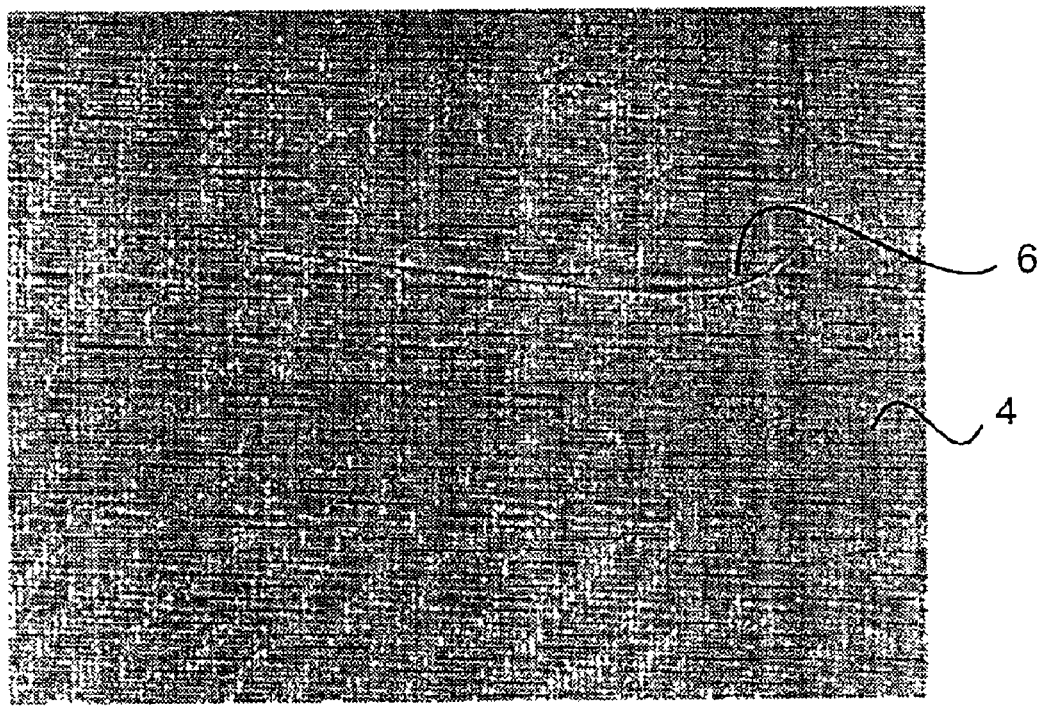
FIG. 9 is a top plan view of a web conveyed on a prior art roller showing a typical honing defect.

Referring to FIGS. 2A, 5, and 6, the finish of roller surface 12 and the process for producing such a finish (described more fully below) are important factors in venting air entrained between the web 2 and roller surface 12. These factors also contribute to the elimination of objectionable impression and honing defects (described above) in the conveyed web 2. Moreover, these factors enable web tensions less than 40 N/m at web speeds greater than 150 m/min.

Another important feature of the novel and unobvious roller surface 12 of conveyance roller 10 of the invention is that surface 12 has a high release surface property that inhibits the collection of debris. The high release surface property is measured by attaching a piece of stripping tape to a portion of the roller surface 12 and then operating the roller at a speed that ultimately produces separation from the roller surface 12. The non-marking and high release features of the roller surface 12 of the invention allow its use throughout a web conveyance machine (not shown).

Figure 10:
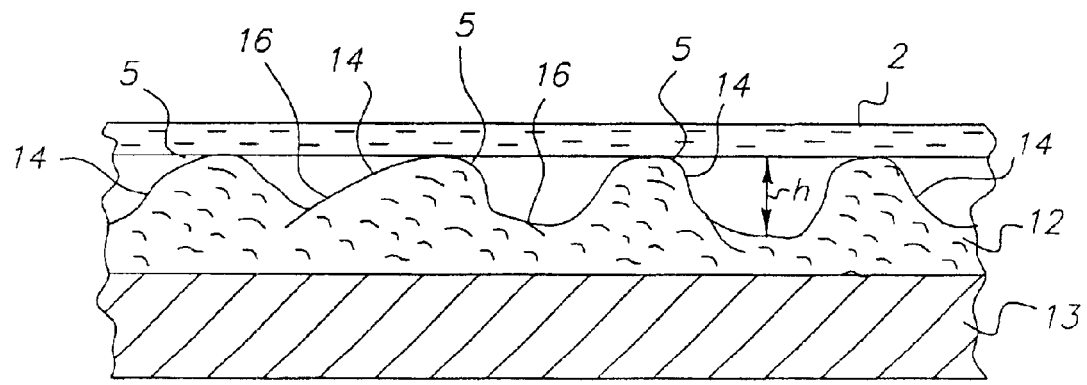
FIG. 10 is an enlarged cross-section view of the roller of the invention.

Referring to FIG. 10, the rounded up features 14 of roller surface 12 have average heights (h) in the range from 0.00005 inches to 0.002 inches. These average heights (h) are associated with the specific groups or types of sprayed surface finishes. For instance, one type of sprayed surface finish has a base material, e.g., acetate, which is minimally cured. Skilled artisans will appreciate that acetate goes through a range of cured states. When acetate is stripped from a casting surface, the acetate is at a 50% solvent concentration. By the time that the acetate is wound into a roll to form a finished product, the solvent concentration, for instance for photographic products, is less than 3.5%.

Referring again to FIG. 10, another sprayed surface finish used in our experiments is one in which the base material is partially or completely cured. According to this surface finish, heights (h) of rounded up features 14 are produced in the range of about 0.0001 inches to 0.004 inches.

Referring to FIGS. 5, 7A and 7B, surface roughness $R_a$ of the generally irregular surface 12 having the rounded up features 14 ranges preferably between 20 micro-inches to about 500 micro-inches. It has been demonstrated that the aforementioned roughness range of roller surface 12 avoid scratching a web 2 conveyed by the roller surface 12 of the invention. According to FIG. 5, experience has shown webs to be conveyed that are very sensitive to impression defects, e.g., freshly cast acetate, require a conveyance roller surface roughness of less than 80 micro-inches to avoid the occurrence of such defects.

Figure 11:
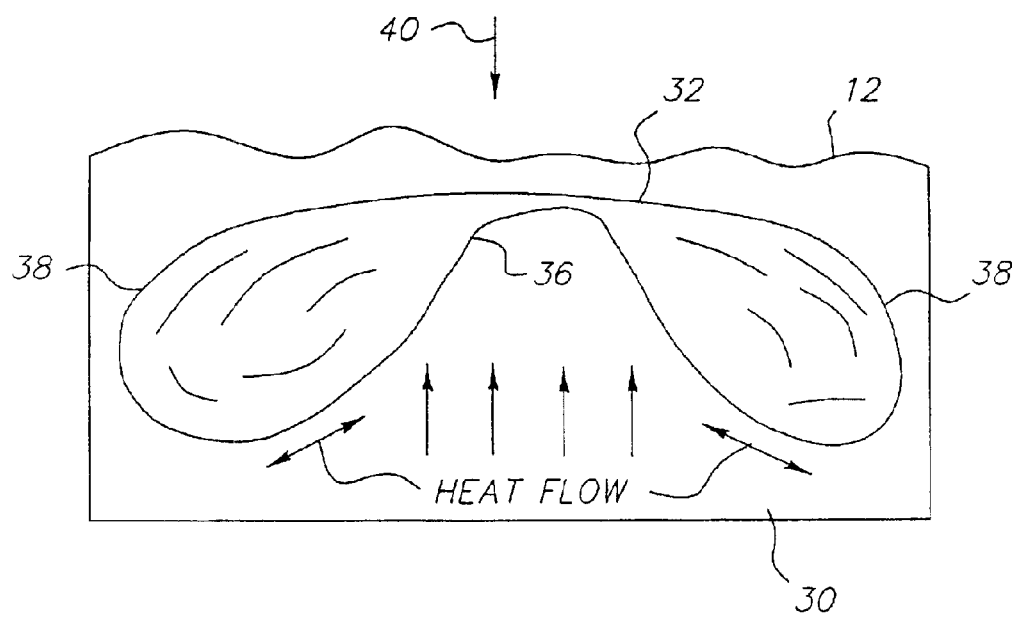
FIG. 11 is a cross-section view of a thermal spray particle formation on a substrate.

Referring to FIGS. 5 and 6, the finished roller surface 12 of the invention is made using preferably a thermal spray process. High velocity oxy-fuel, high velocity air fuel, and a detonation gun are a few examples of pertinent thermal spray processes that may be used to produce the surface finish of the invention. Moreover, there is a wide variety of thermal spray powders such as WC—Co, WC—Co—Cr, WC—NiCr, WC—NiCr—C. We have found that the preferred powder, for instance, for an idler roller is WC—Co that results in a very unique surface morphology. Depending on the materials used, roller surface 12 made by the thermal spray process generally possess a large range of advantageous features, such as wear resistance, high release properties, corrosion resistance, etc. The roller surface 12, once sprayed, has rounded up features 14, illustrated in FIGS. 5, 6, 10, and 11. As illustrated in FIG. 11, as a molten spray particle (arrow 40 is the particle impingement direction) impinges substrate surface 30, a molten deposit 32 is formed on the substrate surface 30. Molten deposit 32 generally has a rounded up portion 36 adjoining lateral portions 38 that are uniquely produced by the thermal spray process. These features (as previously discussed) impart good traction as a roller surface while not marking sensitive webs 2 (FIG. 10).

Those skilled in the art will appreciate that thermal spray coating processes are commonly used to deposit metals, oxides, cermets, and inter-metallic compounds onto roller surfaces to improve performance characteristics. The thermal spray processes (as shown in FIG. 11) form coatings by depositing finely dispersed molten and semi-molten particles onto metallic or organic substrates. The particles impinge onto the surface and flatten forming a series of platelets that adhere to the surface and each other. The coating thickness increases as more particles strike the surface and cool forming a laminar structure. The resulting surface morphology consists of rounded, raised asperities or rounded up features. The height, spatial frequency, and curvature of the rounded up features are a function of the substrate roughness, coating material, specific thermal spray process, process parameters, techniques deployed, particle size, and post coating processes.

Referring to FIGS. 6 and 10, the extremely rough irregular surface features ($R_a > 100$ micro-inches) provide venting of entrained air between the conveyed web 2 and roller surface 12. Illustrated in FIG. 10, the smooth rounded up features 14 of roller surface 12 are substantially in continuous contact with the conveyed web 2. As a result, impression or honing defects 6 in the conveyed web 2 are eliminated. Depending on the speed and tension required and web sensitivity to impressions, a different surface roughness can be used.

Figure 4:
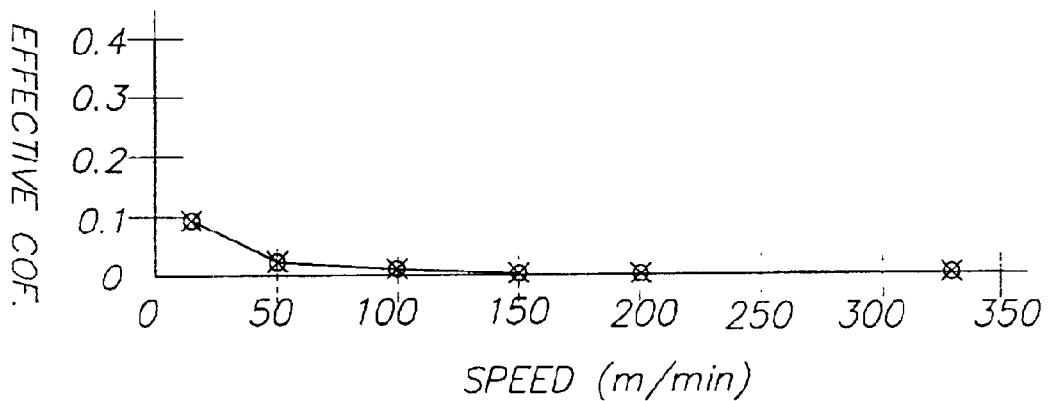
FIG. 4 is a graph of the traction values of a standard web conveyed on a prior art roller.
Figure 8:
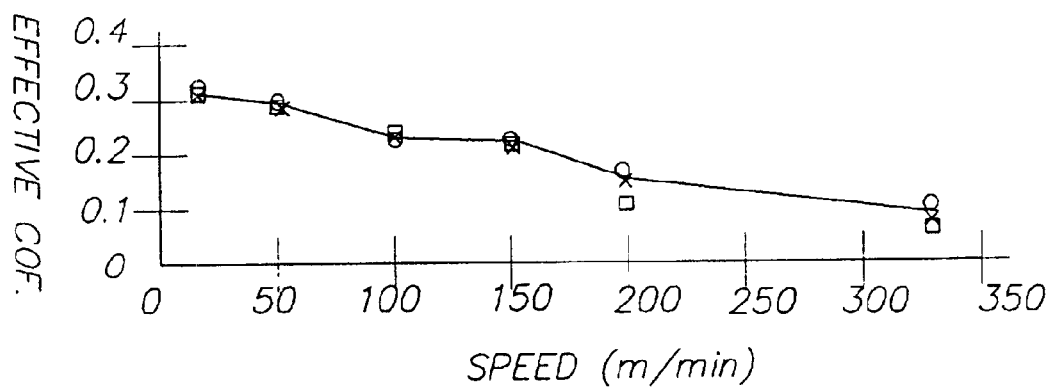
FIG. 8 is a traction curve of the roller of the invention.

Referring to FIG. 8, web-to-roller traction of the roller surface 12 of the invention is illustrated. Comparing the curve of FIG. 8 to curve of FIG. 4, the traction of the roller surface 12 is clearly shown to be far superior to the traction of the polished roller surface 4 of the prior art. More particularly, the roller surface 12 of the invention has a traction range (represented by the coefficient of friction) between 0.32 to about 0.12 corresponding to a roller speed of about 20 m/min to about 330 m/min, respectively. In contradistinction, the polished roller surface 4 of the prior art has a traction range (FIG. 4) of about 0.08 to about 0, corresponding to a roller speed of 20 m/min to a top speed of about 50 m/min.

In another embodiment of the invention, a method of fabricating a roller 10 for conveying a web 2 includes the step of thermal spraying a dispersed molten powder on a substrate to achieve the desired finish roller textured surface 12. Preferred molten powders are selected from the group consisting of WC—Co, WC—Co—Cr, WC—NiCr, and WC—NiCr—C. As described above, the resultant textured surface 12 is characterized with rounded up features 14 protruding from the surface 12, as illustrated in FIG. 10. The average heights (h) of the rounded-up features 14 range from about 0.00005 inches to about 0.002 inches.

Examples of rollers 10 made by the aforementioned process include stripping and ladder rollers. Stripping and ladder rollers are typically located close to the casting surface and require a surface that has a lower $R_a$. These rollers are manufactured using the HVAF process and propitiatory brushing techniques and the use of WC—Co powder. Idler rollers in the balance of the machine can use higher $R_a$ surfaces that are created by using the HVOF process with WC—Co powder with propitiatory brushing techniques.

The invention has been described with reference to a preferred embodiment. However, it will be appreciated that variations and modifications can be effected by a person of ordinary skill in the art without departing from the scope of the invention.

PARTS LIST 1 prior art conveyance roller
2 web being conveyed
4 polished roller surface of the prior art
5 interface between web and roller surface
6 honing defect
10 web conveyance roller of the invention
12 surface finish of roller 10
13 substrate
14 rounded up features of roller 10
16 venting pathways
30 substrate surface
32 molten deposit
36 rounded up portion of molten deposit 32
38 lateral portions of molten deposit 32
40 molten particle impingement direction

What is claimed is:

1. A web conveyance roller a comprising a substrate and a surface layer on said substrate, said substrate comprising a material selected from a group consisting of stainless steel, cast iron, nickel, copper and carbon composite, said surface layer comprising a tungsten containing material thermally sprayed onto said substrate forming a generally irregular surface, said generally irregular surface comprising a plurality of generally rounded up features having rounded peaks and rounded sides, many of said generally rounded up features overlapping to form venting pathways randomly arranged along said generally irregular surface of said web conveyance roller, said venting pathways comprising at least about twenty-five percent of the area of said surface layer, the height of said generally rounded up features being greater than about 0.00005 inches but less than about 0.002 inches, said generally irregular surface comprising said generally rounded up features having an $R_a$ in the range from about 20 micro-inches to about 500 micro-inches to avoid scratching a web conveyed by said web conveyance roller.

2. The web conveyance roller recited in claim 1 wherein said generally irregular surface produces traction defined by the effective coefficient of friction in the range of about 0.33 to about 0.12, corresponding to a roller speed from 20 m/min to about 330 m/min, respectively.

3. The web conveyance roller recited in claim 1 having a traction in the range of about 0.16 to about 0.12, corresponding to roller speeds in the range of 200 m/min to about 330 m/min, respectively.

4. A web conveyance roller having a generally irregular surface, said generally irregular surface comprising a plurality of generally rounded up features having rounded peaks and rounded sides formed by thermal spraying a select substrate with a powder comprising WC—Co—Cr, many of said generally rounded up features overlapping to form venting pathways randomly arranged along said generally irregular surface of said web conveyance roller, said venting pathways comprising at least about twenty-five percent of the area of said surface layer, the height of said generally rounded up features being greater than about 0.00005 inches but less than about 0.002 inches, said generally irregular surface comprising said generally rounded up features having an $R_a$ in the range from about 20 micro-inches to about 500 micro-inches to avoid scratching a web conveyed by said web conveyance roller.

5. A web conveyance roller having a generally irregular surface, said generally irregular surface comprising a plurality of generally rounded up features having rounded peaks and rounded sides formed by thermal spraying WC—C—Co onto a preselected substrate forming a thermally sprayed surface, said thermally sprayed surface having an average roughness $R_a$ of about 154 micro-inches, many of said generally rounded up features overlapping to form venting pathways randomly arranged along said generally irregular surface of said web conveyance roller, said venting pathways comprising at least about twenty-five percent of the area of said surface layer, the height of said generally rounded up features being greater than about 0.00005 inches but less than about 0.002 inches, said generally irregular surface comprising said generally rounded up features having an $R_a$ in the range from about 20 micro-inches to about 500 micro-inches to avoid scratching a web conveyed by said web conveyance roller.

* * * * *